United States Patent
Sawyers

(10) Patent No.: US 8,176,349 B2
(45) Date of Patent: May 8, 2012

(54) LOOK-AHEAD PROCESSOR FOR SIGNALING SUITABLE NON-IDLE PERFORMANCE STATE FOR MAIN PROCESSOR

(75) Inventor: Thomas P. Sawyers, Hempstead, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 512 days.

(21) Appl. No.: 12/433,314

(22) Filed: Apr. 30, 2009

(65) Prior Publication Data

US 2010/0281282 A1 Nov. 4, 2010

(51) Int. Cl.
*G06F 1/00* (2006.01)
*G06F 1/32* (2006.01)
(52) U.S. Cl. .................. 713/323; 713/320; 713/321
(58) Field of Classification Search .................. 713/323
See application file for complete search history.

(56) References Cited

U.S. PATENT DOCUMENTS

| 4,755,933 | A | 7/1988 | Teshima | |
|---|---|---|---|---|
| 5,040,107 | A | 8/1991 | Duxbury | |
| 5,133,060 | A | 7/1992 | Weber | |
| 5,537,656 | A * | 7/1996 | Mozdzen et al. | 713/323 |
| 6,347,379 | B1 * | 2/2002 | Dai et al. | 713/320 |
| 6,363,112 | B1 | 3/2002 | Azadet | |
| 6,625,740 | B1 * | 9/2003 | Datar et al. | 713/324 |
| 7,836,320 | B2 * | 11/2010 | Harris | 713/324 |
| 8,024,590 | B2 * | 9/2011 | Song et al. | 713/321 |
| 2003/0061383 | A1 | 3/2003 | Zilka | |
| 2003/0084353 | A1 | 5/2003 | Chang et al. | |
| 2005/0149769 | A1 | 7/2005 | O'Connor et al. | |
| 2007/0136615 | A1 | 6/2007 | Son et al. | |

OTHER PUBLICATIONS

International Searching Authority, International Search Report and the Written Opinion dated May 24, 2010, pp. 10.

* cited by examiner

*Primary Examiner* — Suresh Suryawanshi

(57) ABSTRACT

A look-ahead processor identifies instructions that are at least likely to be executed by a main processor. The look-ahead processor determines a power state for the main processor that is suitable for executing the instructions. The look-ahead processor signals the main processor to enter the suitable performance state.

10 Claims, 3 Drawing Sheets

LOOK-AHEAD PROCESSOR FOR SIGNALING SUITABLE NON-IDLE PERFORMANCE STATE FOR MAIN PROCESSOR

BACKGROUND

Limiting power consumption by a computer processor has several benefits including: reducing energy costs, reducing heat build-up and the burden on a cooling system to remove heat dissipated by the processor, and, in the case of a battery-powered computer, extending battery life. Accordingly, many processors have different power states, including performance states and idle states. The different performance states can involve different clock frequencies, with higher clock frequencies providing higher performance, but consuming more power. The idle states can include, for example, "power off", "hibernate", and "sleep states".

DETAILED DESCRIPTION

Figure 1:
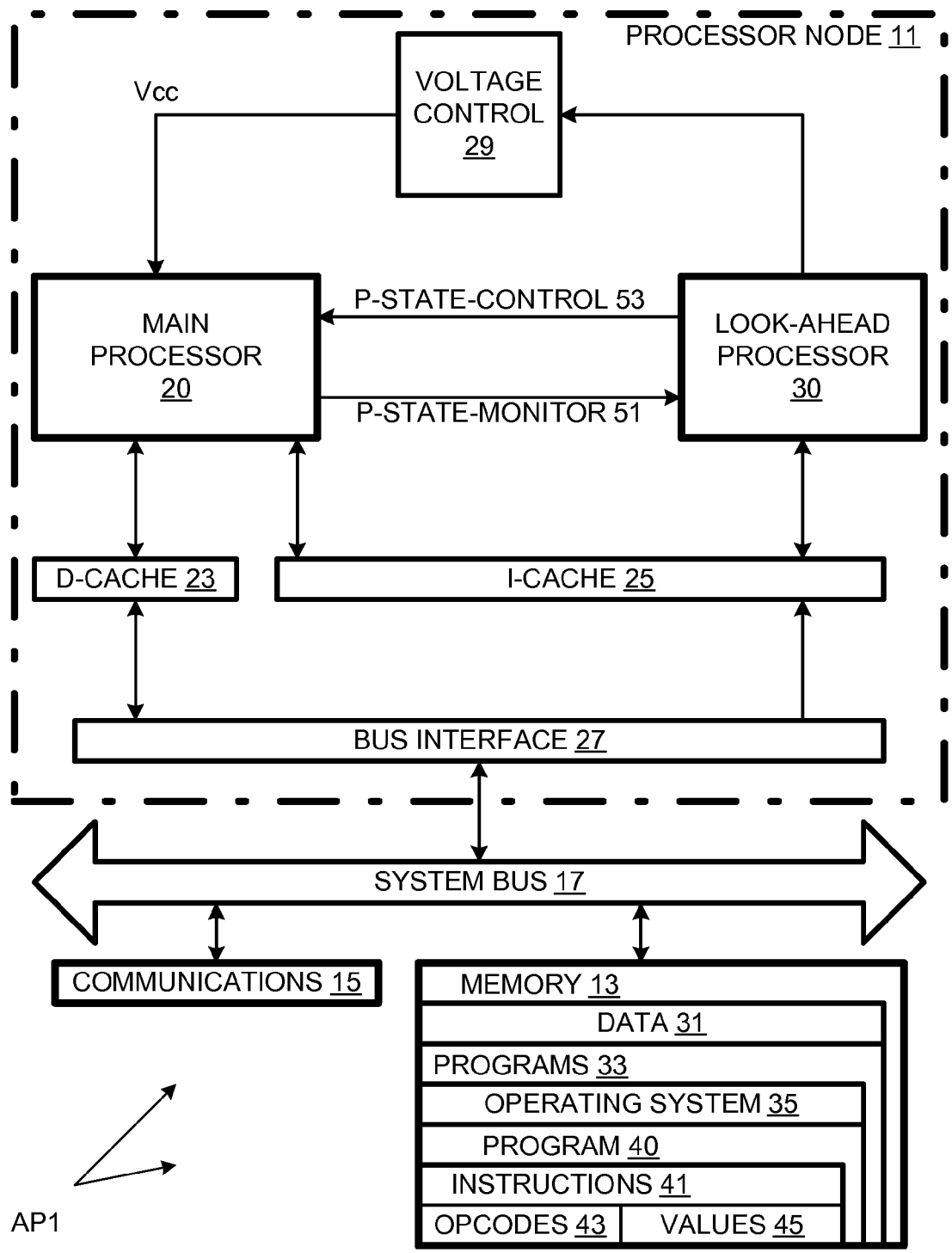
FIG. 1 is a schematic diagram of a computer system including main and look-ahead processors.

A computer system AP1 includes a processor node 11, memory 13, and communications devices 15. These components communicate with each other via a system bus 17. Processor node 11 includes a main processor 20, a data cache 23, an instruction cache 25, a bus interface 27, a voltage controller 29, and a look-ahead processor 30.

Main processor 20 manipulates data 31 in accordance with programs 33 of instructions. Data 31 and programs 33 are stored in memory 13. Programs 33 include an operating system 35, and a program 40. Program 40 includes instructions 41, which in turn include respective opcodes 43 and values 45 of parameters defined by respective opcodes 43.

Processor node 11 keeps copies of data likely to be used in the near future in data cache 23 for faster access by main processor 20. Likewise, processor node 11 maintains copies of instructions likely to be used in the near future in instruction cache 30 for faster access by main processor 20. Instructions and data are likely to be used for example, when they have been recently used or are stored in memory nearby (e.g., in the same memory section or line) to recently used instructions or data.

Look-ahead processor 30 is coupled to instruction cache 25 so that it can identify instructions that are soon to be executed or are otherwise at least likely to be executed soon by main processor 20. For example, an instruction fetched by main processor 20 from cache 25 is very likely (e.g., barring an interrupt) to be executed soon. Instructions that follow a fetched instruction in a cache line are also likely to be executed soon. More generally, all cached instructions are relatively likely to be executed soon (which is why they are cached in the first place).

In addition, look-ahead processor 30 can inspect program 40 in memory 13 (via I-cache 25) to characterize sections of program 30 or program 30 as a whole. Such an inspection can be performed, for example, while main processor 20 is in an idle state. Look-ahead processor 30 can use information obtained by accessing instructions from memory 13 to help identify instructions that are likely to be used soon and to determine a suitable performance state for executing those instructions. Look-ahead 30 can use information so obtained to identify those instructions as they are fetched and signal main processor 20 to enter the predetermined performance states.

Look-ahead processor 30 is coupled to main processor 20 for monitoring 51 and controlling 53 power states of main processor 20. For example, if look-ahead processor 30 determines that a series of multimedia instructions (e.g., as might be encountered when decompressing streaming video) are to be executed soon, look-ahead processor 30 might signal main processor 20 to enter a maximum performance state. For another example, if look-ahead processor 30 identifies instructions associated with typing characters into a word processor, look-ahead processor 30 can signal main processor 20 to enter a low performance state.

By monitoring the power states (performance and idle states) of main processor 20, look-ahead processor 30 can evaluate how well its determinations of suitable performance states are working. If, for example, look-ahead processor 30 may find that main processor 20 is frequently entering sleep states. Main processor 20 may be entering sleep states while waiting for additional instructions. In response, look-ahead processor 30 can bias its determinations of suitable performance states toward lower performance states so that main processor 20 spends less time sleeping. This strategy should result in main processor 30 spending less time in higher performance states and less time switching in an out of idle states.

Look-ahead processor 30 is coupled to voltage controller 29, for controlling Vcc and thus the voltage differential Vcc across main processor 20. Look-ahead processor 30 lowers the voltage differential across main processor 20 when the latter is a low-performance state. While a high voltage differential is required during the high-clock frequency operation that characterizes a high performance state, a lower voltage differential suffices at lower clock frequencies. Thus, during a lower-performance state, power is saved not only because of the lower clock-frequency, but also because of the lowered voltage differential.

Figure 2:
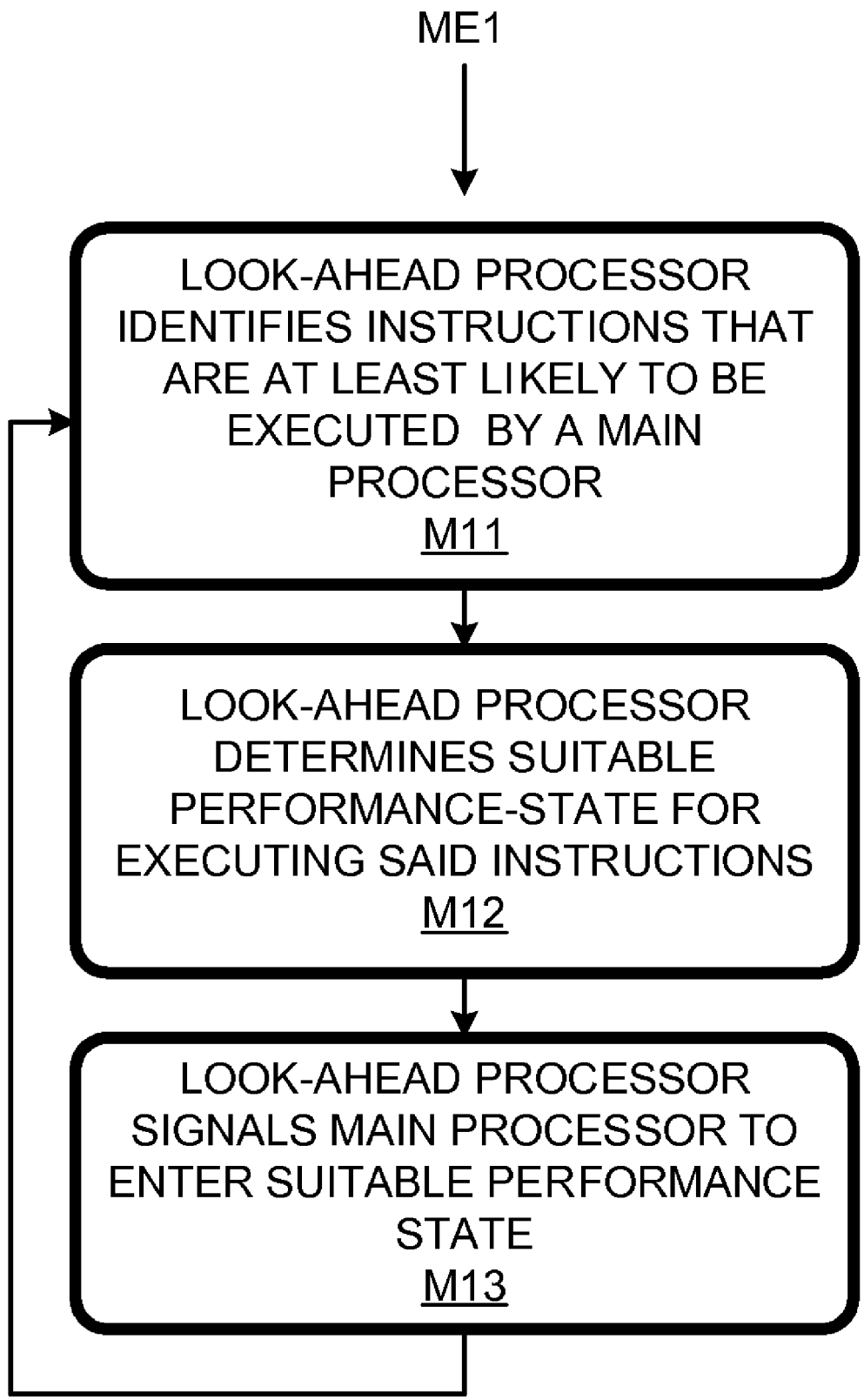
FIG. 2 is a flow chart of a method implemented using the look-ahead processor of FIG. 1.

A basic method ME1 implemented by look-ahead processor 30 in a first mode is flow charted in FIG. 2. At method segment M11, look-ahead processor 30 identifies instructions that are likely to be executed soon. At method segment M12, look-ahead processor determines suitable performance states for main processor 20. At method segment M13, look-ahead processor 30 signals main processor 20 to enter the suitable performance state. These steps are iterated on an ongoing basis.

Figure 3:
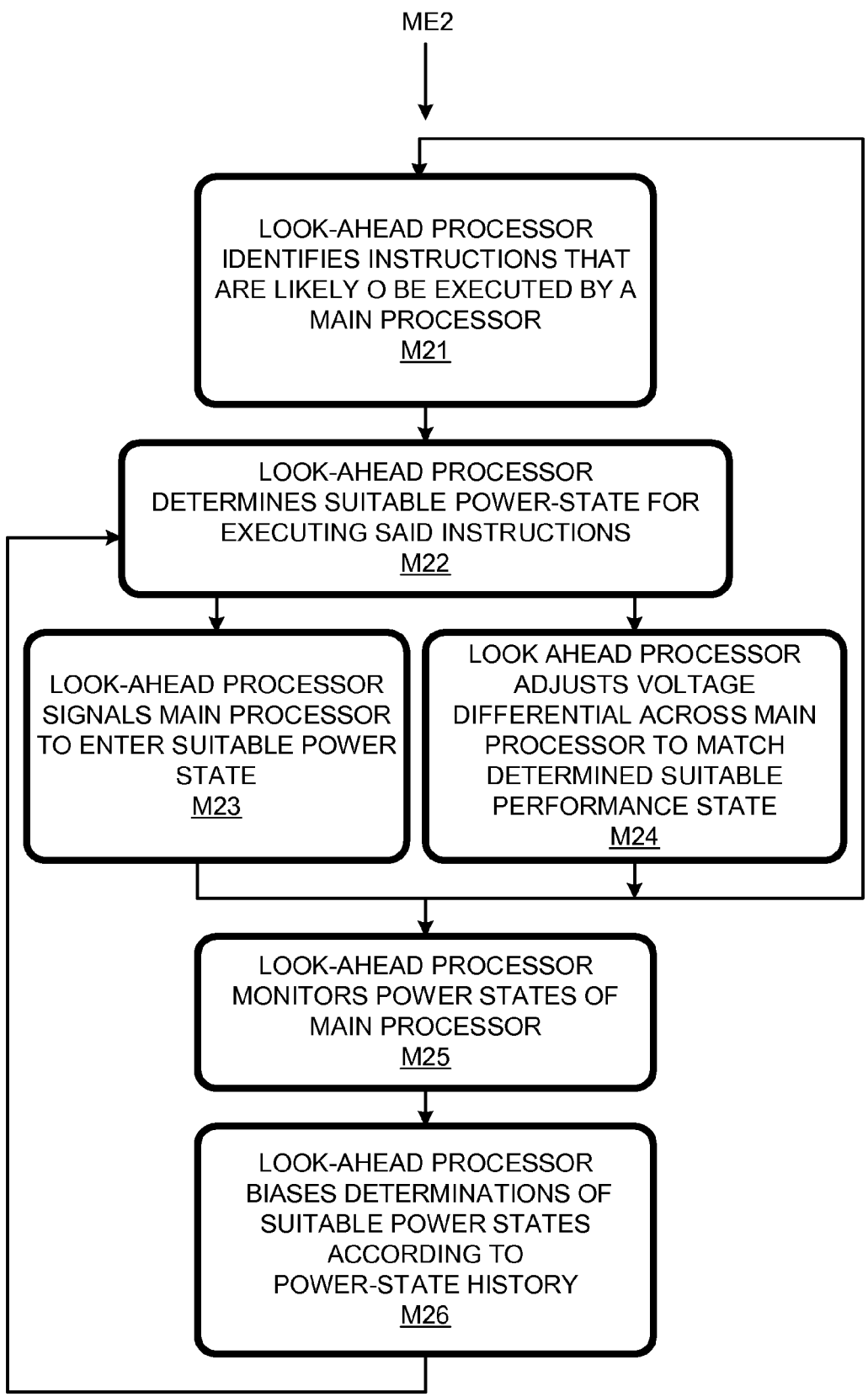
FIG. 3 is a flow chart of another method implemented using the look-ahead processor of FIG. 1.

In a second mode, look-ahead processor can implement a more elaborate method ME2, flow charted in FIG. 3. Method segments M21-M23 correspond to method segments M11-M13 of method ME1. At method segment M21, look-ahead processor 30 identifies instructions that are likely to be executed soon. At method segment M22, look-ahead processor determines suitable performance states for main processor 20. At method segment M23, look-ahead processor signals main processor 20 to enter the suitable performance state.

At method segment M24, look-ahead processor 30 adjusts (via voltage controller 29) the voltage differential across main processor 20 to match the determined suitable performance state for main processor 20. The order in which method segments M23 and M24 are implemented depends on the direction of the voltage adjustment since 1) a higher voltage differential is required for higher performance states, and 2)

voltage adjustments are not instantaneous. Thus, a downward adjustment of the voltage differential at method segment M24 is implemented after a downward adjustment of performance state at method segment M24; on the other hand, an upward adjustment of voltage differential at method segment M24 is implemented before an upward adjustment of performance state at method segment M23.

Not all changes in performance states call for adjustments in voltage differential. For example, main processor 20 has six performance states P1-P6. The highest performance states P1 and P2 require a 1.2-volt differential, while progressively lower performance states P-3-P6 require a 1.1V, 1.0V, 0.9V, 0.8V differentials respectively. A transition from performance state P6 to performance state P5 would not call for a change in voltage differential, which would remain at 1.2 volts. However, a change from P5 to P4 would permit a downward adjustment from 1.2 volts to 1.1 volts. In other embodiments, other voltage ranges are employed.

In view of this non-1:1 relationship between performance states and power states, the cost-benefit considerations favor the highest performance states for a given voltage differential. Accordingly, look-ahead processor 30 biases its suitability determinations toward the highest performance state for a given voltage state. Performance state P4 would be favored over performances states P3 and P5 in close cases.

Look-ahead processor 30 monitors the power state of main processor 20 at method segment M25. While look-ahead processor 30 can cause main processor 20 to change power states, main processor 20 can change for other reasons as well, e.g., entering a sleep state after a time-out due to a lack of instructions to execute. Such time-outs can happen frequently when look-ahead processor 30 is setting the performance state of main processor 20 too high. Thus, at method segment M26, look-ahead processor 30 can bias the determinations of suitable power states (method segment M22) to reduce the frequency with which sleep states are entered. This allows main processor 20 to spend more time in a lower-performance, lower-voltage state, and less time switching back and forth between a sleep state and a higher performance state. In this way, power consumption by main processor 30 can be reduced.

A look-ahead processor can be implemented as a discrete component (i.e., not on an integrated circuit bearing the main processor) or as a special-purpose core that controls performance states and voltages for other cores on a multi-core processor integrated circuit. A look-ahead processor may or may not be designed to examine program instructions that are not about to be executed, e.g., by examining program contents in main memory. A look-ahead processor can be coupled to an instruction cache, or may be coupled to an instruction path upstream or downstream of an instruction cache. Also, a look-ahead processor may access instructions using a path not used for fetching instructions to a main processor. These and other variations upon and modifications to the illustrated embodiment are provided for by at least some of the following claims.

Herein, related art is described for expository purposes. Related art labeled "prior art", if any, is admitted prior art; related art not labeled "prior art" is not admitted prior art.

What is claimed is:

1. A method comprising:
   identifying, by a look-ahead processor, instructions that are at least likely to be executed by a main processor including plural power states including plural non-idle performance states with respective different clock frequencies;
   determining, by said lookahead processor and based on the identified instructions, a suitable non-idle performance state for said main processor that is suitable for executing said identified instructions, said suitable non-idle performance state including an associated suitable clock frequency; and
   causing, by said look-ahead processor, said main processor to change clock frequency with which it executes instructions from a current clock frequency associated with a current non-idle performance state to a suitable clock frequency associated with said suitable non-idle performance state.

2. A method as recited in claim 1 wherein said look-ahead processor adjusts a voltage differential across said main processor to match said suitable non-idle performance state.

3. A method as recited in claim 1 further comprising:
   said look-ahead processor monitoring a power state of said main processor to determine a sleep frequency with which said processor enters a sleep state; and
   said look-ahead processor biasing said determination of said suitable non-idle performance state as a function of said frequency.

4. A method as recited in claim 1 wherein said identifying involves said look-ahead processor reading instructions from an instruction cache for said main processor.

5. A method as recited in claim 1 wherein said look-ahead processor inspects opcodes of said instructions but does not execute said instructions.

6. A system comprising:
   a main processor for executing instructions, said main processor including plural power states including plural non-idle performance states with different associated clock frequencies: and
   a look-ahead processor for,
      identifying instructions that are at least likely to be executed by said main processor,
      determining a suitable non-idle performance state for said main processor suitable based on the identified instructions, and
      causing said main processor to change clock frequency with which it executes instructions from a current clock frequency associated with a current non-idle performance state to a suitable clock frequency associated with said suitable non-idle performance state.

7. A system as recited in claim 6 further comprising: a voltage controller coupled to said main processor, said look-ahead processor being coupled to said voltage controller for controlling a voltage differential across said main processor as a function of said suitable non-idle performance state.

8. A system as recited in claim 7 wherein said look-ahead processor provides for
   monitoring a power-state parameter of said main processor to determine a sleep frequency with which said-processor enters a sleep state; and
   biasing said determination of said suitable power state as a function of said sleep frequency.

9. A system as recited in claim 7 further comprising an instruction cache, said look-ahead processor being coupled to said instruction cache for monitoring instructions therein.

10. A system as recited in claim 9 wherein said look-ahead processor examines the opcodes of said instruction in said cache but does not execute said instructions.

\* \* \* \* \*

UNITED STATES PATENT AND TRADEMARK OFFICE
CERTIFICATE OF CORRECTION

PATENT NO.        : 8,176,349 B2
APPLICATION NO.   : 12/433314
DATED             : May 8, 2012
INVENTOR(S)       : Thomas P. Sawyers Page 1 of 1

It is certified that error appears in the above-identified patent and that said Letters Patent is hereby corrected as shown below:

In column 4, line 33, in Claim 6, delete "frequencies:" and insert -- frequencies; --, therefor.

In column 4, line 45, in Claim 7, delete "comprising:" and insert -- comprising --, therefor.

Signed and Sealed this
Fourth Day of December, 2012

David J. Kappos
*Director of the United States Patent and Trademark Office*